G. W. LA BAW.
SPRING FOR CARRIAGES, WAGONS, &c.
No. 34,549. Patented Feb. 25, 1862.
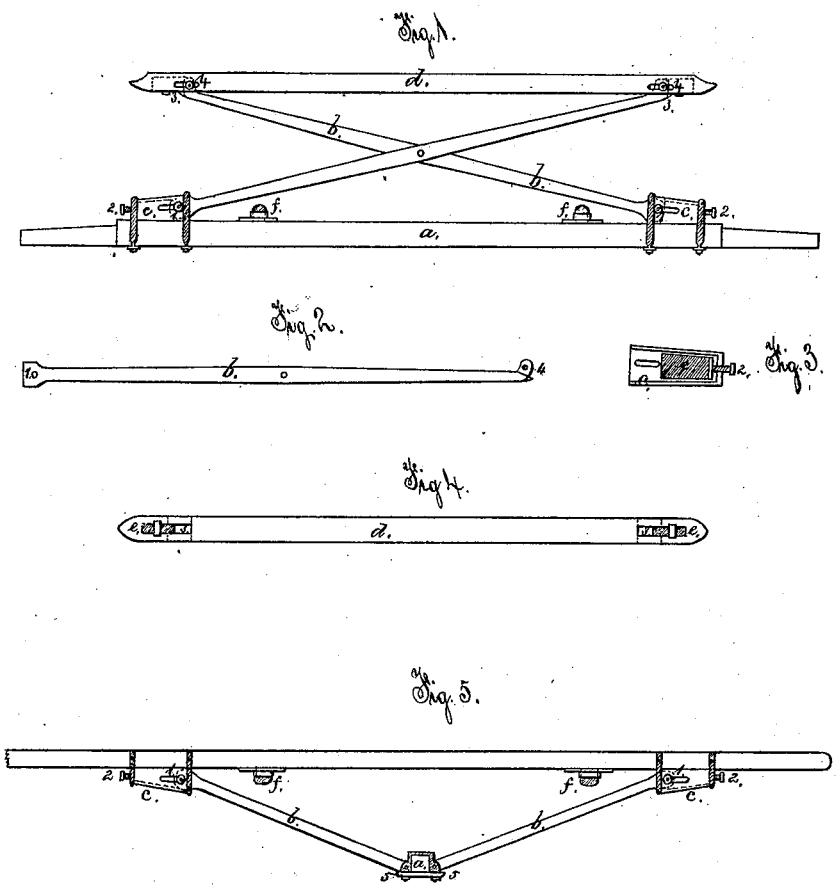

UNITED STATES PATENT OFFICE.

GEORGE W. LA BAW, OF JERSEY CITY, NEW JERSEY, ASSIGNOR TO HIMSELF AND PETER F. CAMPBELL.

SPRING FOR CARRIAGES, WAGONS, &c.

Specification of Letters Patent No. 34,549, dated February 25, 1862.

*To all whom it may concern:*

Be it known that I, GEORGE W. LA BAW, of Jersey City, in the county of Hudson and State of New Jersey, have invented, made, and applied to use a certain new and useful Improvement in Springs for Wagons, Carriages, &c.; and I do hereby declare the following to be a full, clear, and exact description of the nature of the said invention, reference being had to the annexed drawing, making part of this specification, wherein—

Figure 1, is an elevation of said spring as applied to an axle. Fig. 2, is a separate elevation of one of the cross bars. Fig. 3, is a section of the spring box and rubber spring. Fig. 4, is an inverted plan of the bolster, and Fig. 5, is a side view of my spring as applied to a cart frame.

Similar marks of reference denote the same parts.

The nature of the said invention consists in the employment of toggle joint bars in combination with springs of gum elastic, or india rubber, in such a manner that the compression of the rubber is due to the end motion from said toggle joint bars, and the spring communicated to the wagon is of an easy and acceptable character.

In the drawing $a$, is the axle of any ordinary carriage, wagon or other vehicle, $b, b$, are cross bars between the axle $a$, and the bolster $d$.

$c, c$, are metallic boxes firmly attached to the axle or to the bolster or both, and receiving the ends of aforesaid cross bars, which cross bars are made with a broad end to press upon the india rubber springs ($e$, Fig. 3) contained in said boxes $c, c$.

The ends of the bars $b, b$, are guided by cross bolts 1, 1, in slots in the sides of the boxes $c, c$, and these boxes $c, c$, may be provided with set screws (2, 2,) by which to adjust the position of the rubber in said box. The upper ends of the bars $b, b$, I have shown as entering slots 3, 3, in the bolster $d$, and attached by pins 4, 4 in slots that allow of the end movement consequent upon the bolster $d$, being forced down toward the axle $a$. The bars $b, b$, it will be seen, form X parallel motion bars, and hence the body of the wagon will always remain parallel with the axis, and in the rise and fall of said wagon body the springs $e, e$, are compressed, and give an easy yielding movement to the wagon body although said springs themselves are but very slightly compressed. These toggle joint bars when nearly straightened are so powerful in their operation that I provide the buffer springs $f f$, on the axle $a$, so as to prevent the said bars coming too nearly straight. These springs are to be formed of rubber cylinders or cushions attached by small metallic cups. I prefer that the slots 3, 3, be filled with rubber as seen in Figs. 1 and 4, and retained by a small metal cap or cross piece. It will be seen that these cross bars may be applied lengthwise of the wagon, one end resting on the front bolster and the other on the hind axle; and that the boxes $c, c$, may be applied to the upper ends of said bars as well as to the lower ends, or in place of at the lower ends.

In Fig. 5, the toggle joint bars are shown as passing off at right angles to the axle and the boxes $c, c$, as applied to the side frames of the cart; in this case the bars $b, b$, should be jointed to the axle at 5, 5, as shown and the action of all the parts will be the same as before explained.

What I claim and desire to secure by Letters Patent is—

1. The toggle joint bars $b, b$, in combination with the boxes $c, c$, containing the springs of india rubber, as, and for the purposes specified.

2. I claim the cushions or buffers $f, f$, of india rubber applied to take the toggle joint bars $b, b$ in the manner and for the purposes set forth.

In witness whereof I have hereunto set my signature this twenty-first day of January 1862.

GEORGE W. LA BAW.

Witnesses:
LEMUEL W. SERRELL,
THOS. GEO. HAROLD.